United States Patent [19]

Hershberg

[11] 3,747,069

[45] July 17, 1973

[54] INTERVIEWING MACHINES AND METHOD

[76] Inventor: Philip I. Hershberg, 43 Harris Avenue, Needham, Mass.

[22] Filed: Dec. 9, 1970

[21] Appl. No.: 96,327

[52] U.S. Cl. .................................. 340/172.5, 35/9 A

[51] Int. Cl. ............................ G06f 3/16, G09b 7/04

[58] Field of Search ................ 340/172.5 ; 235/157; 35/9 A

[56] References Cited

UNITED STATES PATENTS

| | | | |
|---|---|---|---|
| 3,141,243 | 7/1964 | Chapman et al. | 35/9 A |
| 3,566,370 | 2/1971 | Worthington et al. | 340/172.5 |
| 3,548,385 | 12/1970 | Tunics | 340/172.5 |
| 3,360,873 | 1/1968 | Tillotson et al. | 35/9 A |
| 3,273,260 | 9/1966 | Walker | 35/9 A |

*Primary Examiner*—Paul J. Henon
*Assistant Examiner*—Mark Edward Nusbaum
*Attorney*—Dike, Bronstein, Roberts & Cushman

[57] ABSTRACT

This invention is directed to a method and apparatus for automatically conducting an interview and recording responses elicited from the person interviewed. The apparatus includes means for controlling a magnetic tape recorder which presents questions in both a predetermined and ordered fashion. The apparatus also includes means for recognizing and attempting to rectify improper responses at or shortly after the time that they are elicited. In addition, means are also provided for interpreting the resulting tape for automatic data entry into a keypunch machine, keytape recorder, data terminal, magnetic tape typewriter, computer or similar data entry or storage device.

3 Claims, 5 Drawing Figures

| TAPE TRACK | CONTENTS | | | | | | | | | | | | |
|---|---|---|---|---|---|---|---|---|---|---|---|---|---|
| 1 | QUESTION (Q) TEXT | Q | | Q | | Q | | Q | | Q | | Q | |
| 2 | CODED NUMBERS | 143 | | 144 | | 145 | | 146 | | 147 | | 148 | |
| 3 | RESPONSES | | "YES" | | "NO" | | "I DON'T KNOW" | | "YES" | | "NO" | | — |
| 4 | CONTROL SIGNALS A | C | B | C | B | C | D | C | A | C | B | C | B |
| 5 (OPTIONAL) | INSTRUCTIONS | | | | | | | | | | | | |

INVENTOR
PHILIP I. HERSHBERG
BY
Dike, Thompson & Bronstein
ATTORNEYS

INVENTOR
PHILIP I. HERSHBERG
BY
Dike, Thompson & Bronstein
ATTORNEYS

INTERVIEWING MACHINES AND METHOD

HISTORY OF THE ART

At the present time, interviews conducted for purposes of obtaining information from the interviewee, for example; a job applicant, a medical patient, etc. can be conducted in various ways. For example, the interviewer can present questions verbally and record the answers on a response form. Alternate methods include the use of pencil and paper questionnaires, the results of which can be manually scanned or alternately entered into a computer for processing by means of keypunch, keytape, data terminal or similar means. The interviewee can also communicate directly with the computer which presents questions to the patient by means of computer terminals which may include oscilloscope devices, teletypewriters and similar devices.

There are certain disadvantages to each of the above mentioned interview means. For example, the verbal interrogation of the patient can require significant interviewer time. The questionnaire requires either the immediate proximity of the patient or some delay in making answers available (in the case of mailed or otherwise delivered questionnaires). The use of computer terminals, while ensuring the rapid availability of interviewee responses, requires that the interviewee be present at the terminal location.

SUMMARY OF THE INVENTION

The presently described device is proposed as a means for allowing the interview to be conducted without significant advanced notice, with the interviewee located at a remote site accessible only to telephone or similar facilities, and without the need for special computer or terminal equipment located at the remote site.

The preferred embodiment of the invention comprises a multi-track magnetic or similar tape recorder which can be connected to a telephone subset at a central location and controlled by means of electronic circuitry to direct questions to a remotely located interviewee via telephone lines or the like. The responses are returned to the central location where electronic circuitry determines whether the verbal response was, for example, a "YES" or a "NO," or for example, a response such as "I DON'T KNOW" or some other verbal reply. The verbal response is then decoded by equipment of the type as has been described by D.G. Bobrow and D.H. Klatt, "A Limited Speech Recognition System," AFIPS-Vol. 33, Thompson Book Company, Washington, Copyright 1968 and others (see list of references to this paper), thereby activating certain control devices which determine whether or not the response is appropriate, and if so permitting the response to be entered on a track or channel of the tape. An additional track of the recorder may also contain special instructions to the interviewee and is activated in the case of inappropriate or other special response patterns. Further tracks may contain questions in binary or other computer code and/or control signals and textual data in computer code for direct entry into a magnetic tape typewriter.

The magnetic tape resulting from the interview can then be used to prepare a deck of punched cards via an automatically activated keypunch machine. Alternately, the information may be read into a keytape machine, computer terminal for direct computer entry, magnetic tape teletypewriter or similar device.

OBJECTS OF THE INVENTION

An object of this invention is to provide a means for automatically conducting an interview for purposes of obtaining information from an interviewee located proximal to the interviewing machine or at a site remote from the interviewing machine.

A further but not limited object of this invention is to prepare a magnetic or similar tape containing both questions and interviewee responses in a form which may be entered into one or another form of data or computer processor or storage, thereby permitting ease of handling or storage for both retrieval or research purposes as well as the generation of a printed record of the interviewee's responses.

The invention accordingly comprises the several steps and the relation of one or more of such steps with respect to each of the others and the apparatus embodying features of construction, combination of elements and arrangements of parts which are adapted to effect such steps, all as exemplified in the following detailed description and the scope of the invention will be indicated in the claims.

DESCRIPTION OF THE PREFERRED EMBODIMENTS

A basis for the description of the device is the requirement that certain key questions, if answered affirmatively, will require the interviewee to respond to other questions which are dependent upon the positive answer to the first, thereby expanding upon the positive response to the key question.

Thus there are provided three general types of questions, an "A" type question, which is a key question, a "B" type question, which is a dependent or branch question and is thereby only asked of the interviewee providing an affirmative response to the preceding "A" type question and a "D" type question which is asked of all interviewees so that branching to a "B" type question is not required and the question is followed by the next "A" or "D" type question.

Figures 1, 2, 4:
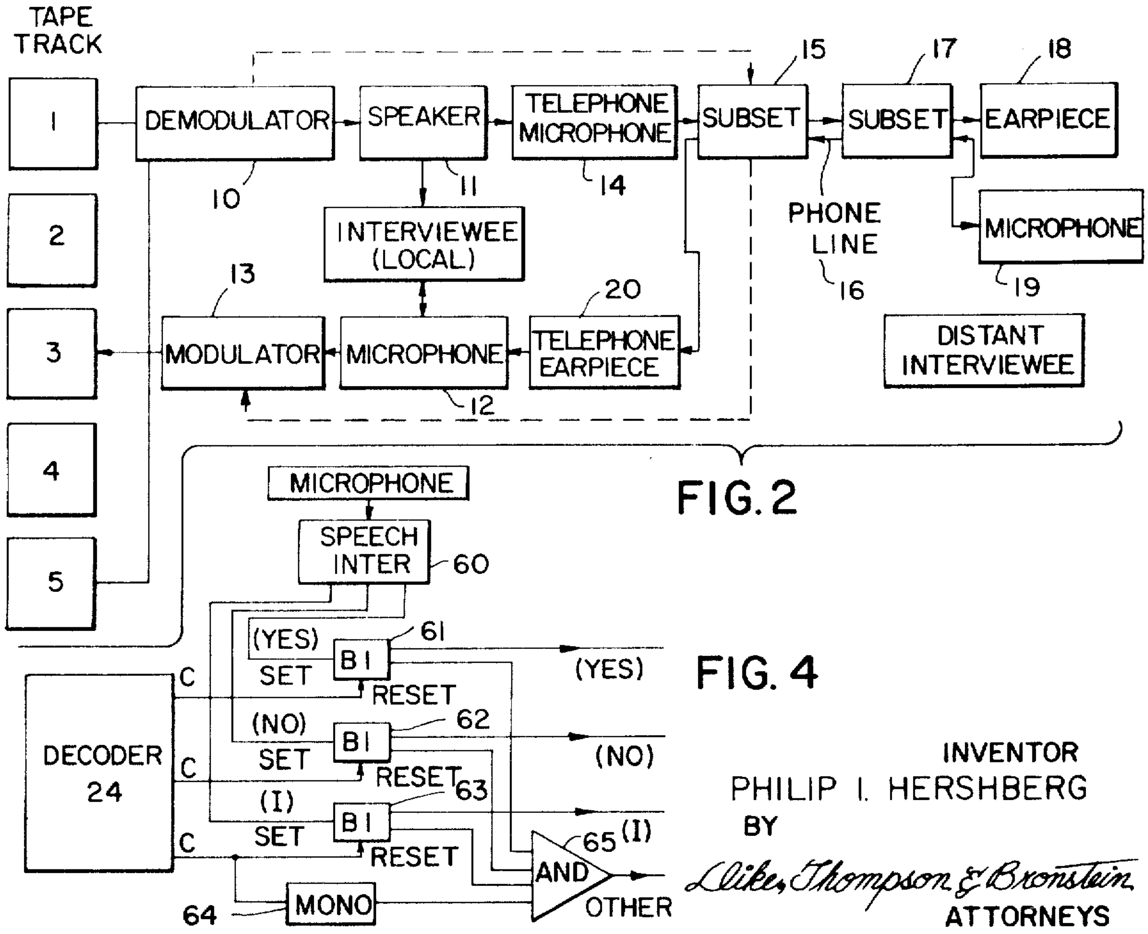
FIG. 1 is a schematic layout of the information carried on the various tracks or channels of a magnetic tape.
FIG. 2 is a block diagram illustrating the means for interconnecting the tape recorder with an interviewee, located either at a proximal or distant location.
FIG. 3 is a block diagram illustrating a system for controlling the tape during the interview and FIG. 4 is a block diagram of the decoder with logic shown in FIG. 3, at 22.

FIG. 1 shows the layout of the five tracks of a magnetic recording tape. On track one there are questions stored in a form adapted to be read out as an audible signal. On track two is the number of the question in coded form. Track three is initially blank and is used to record answers to questions as provided by the interviewee either in audio or code. Track four contains coded label or control signals ( e.g.in digital pulse form) indicating the type of question as follows: A coded "A" or "D" just prior to the corresponding questions indicates that this question must be asked of all interviewees. A coded "B" just prior to the corresponding question indicates that this question must be asked only of those interviewees who answer "YES" to the immediately preceding "A" question. Regardless of the answer to "D" type questions, these are never followed by "B" type questions but rather the tape proceeds to the next "A" or "D" type question. A coded "C" indicates the end of a question on track one.

Track 5 is reserved for instructions to the interviewee which, with proper control, are utilized in lieu of question text under certain pre-determined conditions. Additional tracks (not shown) can be provided for text data in code for computer or magnetic tape typewriter printout if desired.

Track one is prepared by initially dictating the question into the tape recorder and track five by similarly dictating the instructions. Track two is prepared by numerically encoding (using a binary counter and modulator) the appropriate number to the question in track one. Other special control signals can be added at a subsequent time.

Track four is preferably entered into the tape simultaneously with or just prior to track one by encoding the appropriate A, B, C or D code into an area of tape to allow for both sufficient tape (or time) for the question to be posed on track one and also for the interviewee to respond with his answer in track three. If track four is recorded prior to tracks one and five, audio decoding of the A, B, C and D codes then permits the person preparing the tape to place the question and instruction material on the proper tape area.

Track three is prepared as shown in FIG. 2. Track one is read from the tape into demodulator 10 and speaker 11. The interviewee, if located in proximity to the speaker 11, provides his answer into a microphone 12. This is subsequently entered into track three via modulator 13. An alternate configuration, also shown, would permit the question to be entered via microphone 14 or directly from demodulator 10 from the tape into a telephone subset 15 to enter phone line 16 being answered by the interviewee in a distant location via subset 17, earpiece 18 and microphone 19. The response would then return over the phone line 16 to subset 15 either directly entering into the tape recorder via modulator 13 or indirectly via earpiece 20, etc., thereby being recorded on track three. Instructions entered into demodulator 10, etc., from track five do not result in entry into track three.

Figures 3, 5:
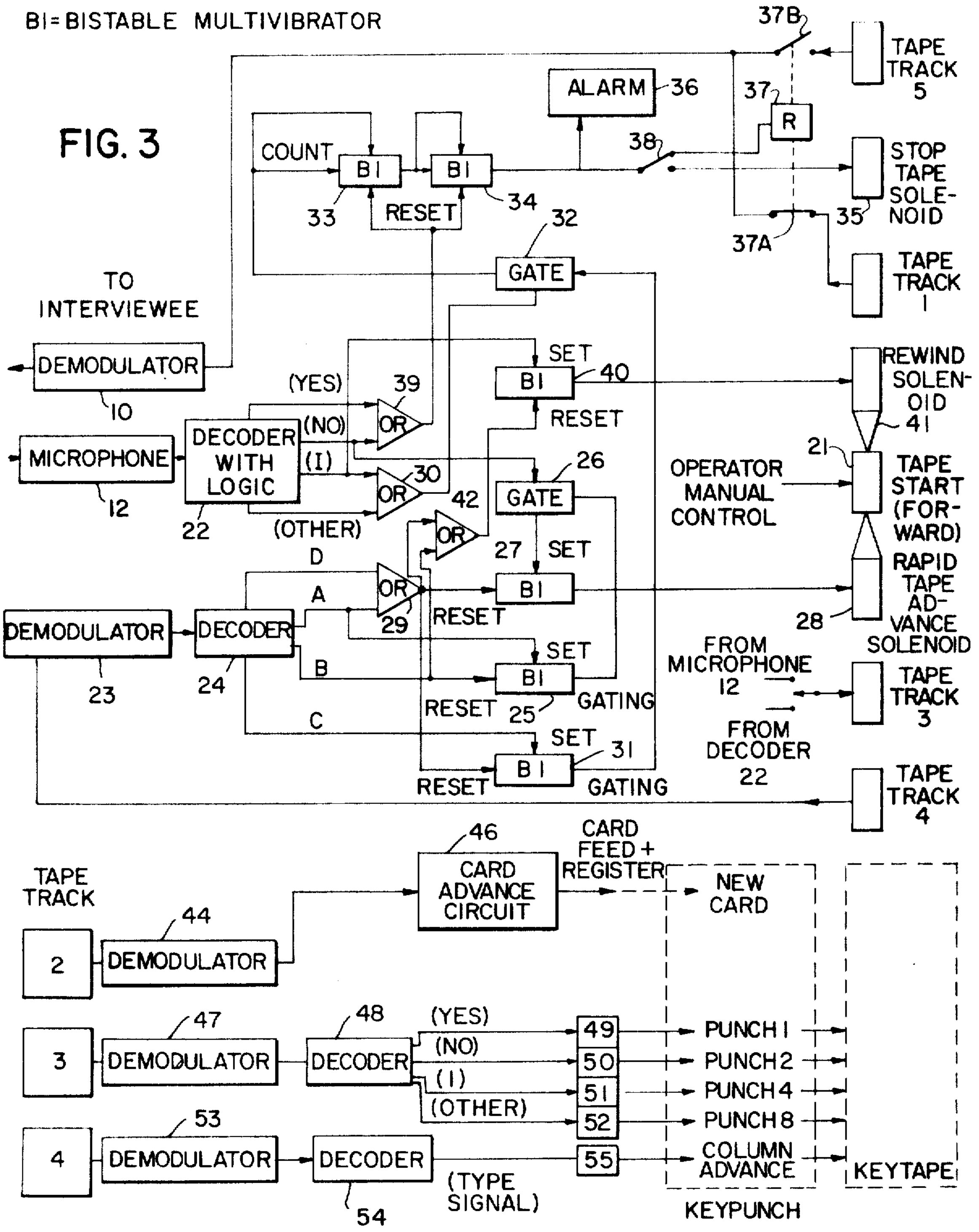
FIG. 5 is a block diagram illustrating an apparatus for reading the prepared tape into one of several different output devices.

FIG. 3 shows a system for controlling the tape during the interview. The tape is started by the operator through activation of the tape recorder start switch 21. So long as the interviewee continues to answer questions properly and in sequential fashion the tape continues to run forward at a constant speed. In this mode, the initial portion of track one contains instructions (for the interviewee) followed by the first question, which, as indicated in FIG. 2 would be directed via demodulator 10, etc., to the interviewee. The responses return via microphone 12 and pass via modulator 13 to tape track three. At the same time, as shown in FIG. 3, the response from microphone 12, or the input to modulator 13, is decoded via decoder with logic 22 which includes a speech interpreter that can be of the type described by D. G. Bobrow, and D. H. Klatt, ("A Limited Speech Recognition System" AFIPS-Vol. 33, Thompson Book Company, National Press Building, Washington, D.C. 1968).

The list of references to this paper also describes a number of other speech interpreters which could likewise serve to perform this same function. The decoding function is actually quite limited in this case, requiring recognition only of the terms "YES," "NO," "I DON'T KNOW" or collectively, a response not detected as being one of these three or no response.

Tape track four information is demodulated via demodulator 23 and then decoded via decoder 24 into code terms A, B, C and D. However, since this data is already in binary form, only a simple digital decoder is required. In its simplest form, this is a counter and output logic circuitry with the codes for A, B, C and D corresponding respectively to 1, 2, 3, and 4 positive bits with code being gated and the count being reset after an appropriate preset time period via a clock or monostable multivibrator (not shown).

The tape automatically progresses from one question to the next. However, this can be interrupted in certain cases. For example, an "A" code in track four sets bistable multivibrator 25, opening gate 26. A "NO" response from decoder 22 passes through gate 26, setting bistable multivibrator 27, thereby putting the recorder tape control condition in the rapid tape advance mode via control solenoid 28. This permits the omission of questions coded with a "B" in track 4 (question branching). (A "NO" response to a "B" coded question would not set bistable multivibrator 27 because bistable multivibrator 25 would have been previously reset upon detection of a "B" type question.)

The next "A" or "D" coded question is detected by decoder 24 and passes through OR circuit 29 to reset bistable multivibrator 27, thereby deactivating solenoid 28 and permitting the tape to resume its normal forward speed.

It should also be understood that it is possible to have subbranching within the "B" type questions themselves, and for this an additional code such as an "E" can be used to activate circuitry similarly used for branching to the "B" type questions. (Alternatively to using code symbols for returning to normal forward speed, a timer can be used to precisely position the tape). An "I DON'T KNOW" or some other response from decoder 22 passes through OR circuit 30 which in conjunction with a gating signal from bistable multivibrator 31, which is set by "C" code and reset by the next "A" or "D" code opens gate 32 and enters a "1" count into the binary counter consisting of bistable multivibrators 33 and 34. After a predetermined count, such as "3" or "4" has been achieved, depending upon interconnection of multivibrators 33 and 34, several optional operations are electively activated.

First, the tape can be stopped via solenoid 35 from bistable multivibrator 34.

Second, an alarm can sound via alarm circuit 36 to alert the operator to improper interviewee question completion.

Third, a timed relay 37 having contacts 37A and 37B can be used to control the flow of information from tracks one and five such that contact 37A is normally closed and contact 37B is open, thereby permitting questions from track one to be presented to the interviewee. If it is recognized that the interviewee has answered "I DON'T KNOW" or some other response to a pre-determined numbers of questions, contact 37A is opened and contact 37B is closed, thereby permitting the instructions on tape track 5 to be audibly presented to the interviewee via demodulator 10. In this mode of operation one or more questions may be intentionally omitted before the presentation of questions is once again instituted. Questions are once again initiated after a predetermined time when timed relay 37 causes contact 37A to close and contact 37B to open, thus re-establishing normal question sequence. A switch 38 is provided to permit the option of either the tape solenoid 35 or the timed relay 37. If a "YES" or a "NO" is recorded, the counter comprising bistable multivibrators 33 and 34 will be reset.

The tape controls are constructed such that the tape start switch 21 is activated when the rapid tape advance solenoid 28 releases. This is accomplished by using a two-position solenoid plunger for solenoid 28.

Another option permits repetition of any question for which the response is "I DON'T KNOW". This is accomplished via bistable multivibrator 40 which is set by this response activating rewind solenoid 41. The first "A," "B," or "D" question code detected while the tape is rewinding then resets bistable multivibrator 40 via OR circuit 42, thereby deactivating rewind solenoid 41. This then automatically activates tape start switch 21 which is activated when rewind solenoid 41 releases. This is accomplished by using a two position solenoid plunger for solenoid 41.

It should be recognized that as an alternate method to the audio recording responses on tape track three, via modulator 13, the decoded responses from decoder 22 can be used to activate a binary encoder, the output of which is directed to modulator 13 and thence to tape track three. A coded interviewee response is then recorded on this track.

FIG. 4 illustrates the mode of operation of the decoder with logic circuit 22. The operation of the speech interpreter has been discussed previously in connection with FIG. 3. The outputs of the speech interpreter pass to bistable multivibrator 61, through 63, which are reset by code "C" signals from decoder 24. In the absence of decoded "YES," "NO" or "I DON'T KNOW" responses at a fixed time interval after each code "C" signal, monostable multivibrator 64 actuates AND gate 65 to permit the recognition of the absense of "YES", "NO" or "I DON'T KNOW" responses before the next question code. In this manner the "YES", "NO", "I DON'T KNOW " and "OTHER" signals are generated.

FIG. 5 details one possible device for reading a tape once it has been produced using either a computer, magnetic tape typewriter, keypunch, or keytape machine. As an example, the present discussion will relate largely to the use of an automatically activated keypunch machine. In this mode, tape track two activates demodulator 44, which activates card advance circuit 46, which detects a special code signal inserted on track 2 each 80th question, thereby sequentially activating the card feed and register controls of a keypunch machine which then sets up a card for punching. Tape track three is read via demodulator 47 and decoder 48, which is either similar to decoder with logic 22 if the information is stored in audio form or similar to decoder 24 if the data is stored in binary form. Appropriate responses are indicated as corresponding card-punched numbers via input circuits 49–52. Each "C" code in tape track four is entered, via demodulator 53 and decoder 54 (similar to decoder 24), into input circuit 55, thereby introducing a column advance signal into the keypunch machine. The result is a deck of cards punched according to the responses on the recorder tape. These decks can be saved and later entered in "batch mode" into a listing printer or a computer programmed to produce a "printout" of the interviewee's responses. Alternately, the responses can be entered via decoders and buffers directly into an "on-line" computer, or the tape, with additional "text" and control tracks, can be read directly into a magnetic tape teletypewriter.

The above described embodiment is not intended to prohibit the interviewee from answering questions in free text into some portion, for example, the initial portion of tape track three. The text answers could then be separately processed by an operator who would transcribe the text into punched card, tape or other data input.

The above discussion is not intended to preclude the programming of a computer to accomplish most of the control functions as described in FIGS. 3 and 4. Using time-sharing techniques, it is possible for the computer to control several tape recording machines simultaneously for use only in presenting questions and to produce almost instantaneous "printouts" of interviewee responses by directly processing the responses rather than recording and then processing them.

Further, electronic controls can replace the tape machine control solenoids discussed previously. Further, with the availability of "touch-tone" telephones it is possible to replace the "YES", "NO" and "I DON'T KNOW" responses by numbers, such as "1," "2"and "3" thereby simplifying some of the decoder circuits. Local interviewees can similarly depress buttons coded as above in lieu of providing verbal answers.

Further, it is possible to stop the tape after each question and start it again only after the interviewee has provided a response, this being accomplished via an auxiliary storage medium.

The subset disclosed herein may be that shown in the text Reference Data for Radio Engineers, Fourth Edition, 1956, on page 826 and labelled "telephone set," the speaker disclosed herein is also shown on page 826 of the same text and is labelled "transmitter," the alarm may be found on page 427 of the same text and is labelled "noise generator," the modulator may be found on page 19 and page 527ff of the same text, the decoder with logic and the card advance circuit may be found on page 964ff of the same text (also page 647 of the specification) and the demodulator may also be found on page 19 and page 529ff of the same text.

It will thus be seen that the objects set forth above, among those made apparent from the preceding description, are efficiently attained and since certain changes may be made in the above constructions without departing from the spirit and scope of the invention, it is intended that all matter contained in the foregoing description or shown in the accompanying drawings shall be interpreted as illustrative and not in a limiting sense.

It is also to be understood that the following claims are intended to cover all the generic and specific features of the invention herein described and all statements of the scope of the invention which, as a matter of language, might be said to fall therebetween.

I claim:

1. Interview apparatus comprising in combination a recording media, a device for controlling the movement of the recording media to provide for a playback and recording mode of operation, said apparatus including playback means, means for causing the recording media to move past said playback means in order to present audible signals recorded on the recording media to an interviewee, the audible signals recorded on the recording media representing instructions and questions, means for recording on the recording media the responses of the interviewee to the audible signals representing question provided to the interviewee, means for interpreting the response of the interviewee to the questions in order to control the movement of the recording media, counting means for counting a series of two or more responses or lack of responses from the interviewee to the questions, means responsive to a signal from said counting means for reinitiating the presentation of instructions after the presentation of questions to the interviewee and a predetermined series of at least two responses or lack of responses have been counted by said counting means, and timing means for providing a signal to reinitiate the presentation of questions to the interviewee after the instructions have been repeated for a predetermined amount of time to the interviewee.

2. Interview apparatus according to claim 1 in which the recording media is a magnetic tape.

3. Interview apparatus according to claim 1 in which the recording media is a magnetic tape which has a plurality of tracks, one of said tracks having question stored thereon and another of said tracks having a code indicating the type of questions stored thereon so as to permit the apparatus to select the questions to be presented to the interviewee depending upon the audible response of the interviewee.

* * * * *